No. 650,627. Patented May 29, 1900.
C. R. ANDERSON.
COAL AUGER COUPLING.
(Application filed Jan. 23, 1900.)

(No Model.)

WITNESSES:

INVENTOR
C. R. Anderson,
BY
ATTORNEY

UNITED STATES PATENT OFFICE.

CECIL R. ANDERSON, OF ALLEGHENY, PENNSYLVANIA.

COAL-AUGER COUPLING.

SPECIFICATION forming part of Letters Patent No. 650,627, dated May 29, 1900.

Application filed January 23, 1900. Serial No. 2,431. (No model.)

*To all whom it may concern:*

Be it known that I, CECIL R. ANDERSON, a citizen of the United States, residing at Allegheny, in the county of Allegheny and State of Pennsylvania, have invented new and useful Improvements in Coal-Auger Couplings, of which the following is a specification.

The object of this invention is to provide an improved coupling for rigidly uniting the members of coal-augers and for other analogous uses.

The invention consists in the novel features of construction hereinafter fully described and claimed, and illustrated by the accompanying drawings, in which—

Figure 1:
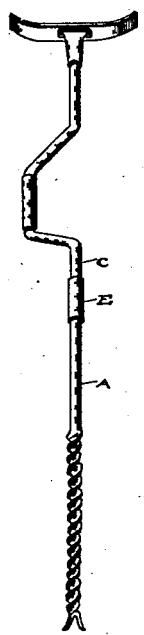
Figure 2:
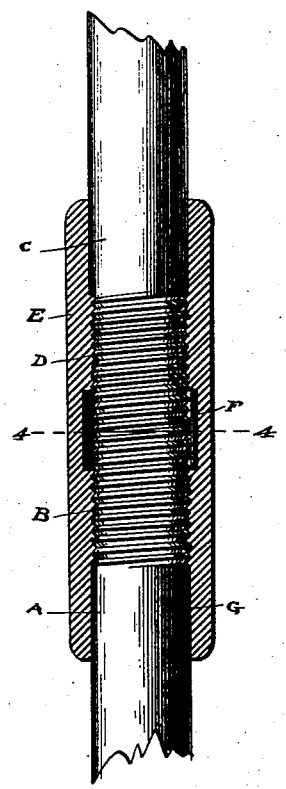
Figure 3:
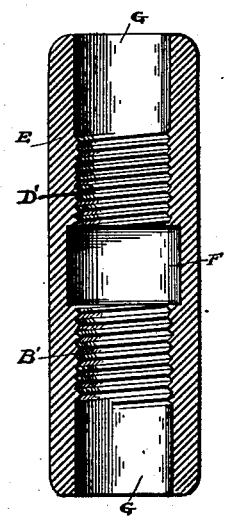
Figure 4:

Figure 1 is a view of a breast-auger provided with my improved coupling. Fig. 2 is a longitudinal sectional view of the coupling applied to the auger members. Fig. 3 is a similar view of the coupling-socket. Fig. 4 is a cross-section on line 4 4 of Fig. 2.

The shank end of auger A is threaded at B, while the extremity of brace-bar C is similarly threaded at D. The interior of coupling socket or sleeve E is threaded at B' to receive the threaded end B of auger A and at D' to unite with threaded end D of brace C. The threads B' and D' are separated by the slightly-enlarged annular space or cavity F, which encircles the abutting extremities of the auger members.

The bore of socket E is smooth for a distance inward from each end, as indicated at G, and of same diameter as the smooth portions of the brace-bar and auger-shank which it embraces, making a snug fit and unyielding union and obviating the unavoidable though slight looseness incident to couplings threaded clear to the ends. The strain to which coal-augers are subjected is very great and it is important that the couplings be absolutely rigid, for with even very slight looseness the parts wear away rapidly and become useless.

When the auger and brace are detached, as is frequently the case, for the purpose of sharpening the auger, &c., the socket-coupling remains on one of the members and particles of coal and other dirt collect therein, so that unless carefully cleaned before recoupling the parts this dirt wedges between the ends of the united members, preventing them from coming together solidly and to that extent impairing the rigidity of the coupling. To obviate this, I provide socket E with the central annular space F, into which the dirt is crowded as the ends come together, permitting them to bear solidly one against the other and making the implement substantially continuous or unbroken, so far as rigidity is concerned, at the point of union of the members. While I do not confine myself to a socket having this cavity in combination with the smooth internal ends, yet I find that these features of construction coöperate to form an unyielding union.

In coal-auger and other similar couplings it is very essential that the end faces of the coupled members bear tightly and uninterruptedly against each other in order to withstand the great strains, lateral or twisting and longitudinal, to which the coupled parts are subjected, and it is to permit of the parts thus coming together notwithstanding accumulation of dirt in the socket that I form the latter with a depression external to the periphery of the coupled parts, into which the dirt is crowded when the faces of said parts are forced together. Otherwise and as at present the dirt lodges between the members and prevents them from uniting in the manner necessary to make a rigid and durable joint.

Having thus fully described my invention, what I claim as new, and desire to secure by Letters Patent, is—

1. In a coal-auger coupling, the combination of a coupling or uniting member having a bore, two members adapted to be united in the bore of said coupling member with the faces of their extremities in contact, the exterior surfaces of the coupled members, at the meeting-point of their extremities being separated from the internal wall of the uniting member by a space adapted to receive dirt crowded thereinto by the coming together of the extremities of the coupled members, substantially as shown and described.

2. An improved coal-auger coupling, comprising a sleeve or socket threaded internally, the threads stopping short of the extremities of the sleeve or socket bore and also interrupted by an annular depression in the internal wall of the sleeve, and members to be coupled having their ends introduced into
5 the sleeve or socket with their faces abutting at a point opposite said depression, substantially as shown and described.

In testimony whereof I have hereunto set my hand in presence of two subscribing witnesses.

CECIL R. ANDERSON.

Witnesses:
  J. M. NESBIT,
  J. H. LAING.